United States Patent
Castellani et al.

(10) Patent No.: US 9,072,407 B2
(45) Date of Patent: Jul. 7, 2015

(54) MACHINE FOR PREPARING BEVERAGES, IN PARTICULAR COFFEE, WITH LIMESCALE-PREVENTION SYSTEMS AND RELATIVE METHOD

(75) Inventors: Andrea Castellani, Milan (IT); Socrate Contessa, Salerno (IT); Paolo Ciambelli, Napoli (IT); Diana Sannino, Castellammare di Stabia (IT); Elvirosa Brancaccio, Salerno (IT)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 1380 days.

(21) Appl. No.: 12/671,940

(22) PCT Filed: Jul. 24, 2008

(86) PCT No.: PCT/IT2008/000499
§ 371 (c)(1),
(2), (4) Date: Nov. 15, 2011

(87) PCT Pub. No.: WO2009/022365
PCT Pub. Date: Feb. 19, 2009

(65) Prior Publication Data
US 2012/0121769 A1  May 17, 2012

(30) Foreign Application Priority Data

Aug. 10, 2007  (IT) .................. FI2007A0187

(51) Int. Cl.
A47J 31/00  (2006.01)
A47J 31/60  (2006.01)
A47J 31/54  (2006.01)
C02F 1/48  (2006.01)
C02F 9/00  (2006.01)

(52) U.S. Cl.
CPC .............. *A47J 31/605* (2013.01); *A47J 31/542* (2013.01); *C02F 1/481* (2013.01); *C02F 1/482* (2013.01); *C02F 1/484* (2013.01); *C02F 1/485* (2013.01); *C02F 9/005* (2013.01); *C02F 2201/483* (2013.01); *C02F 2303/22* (2013.01)

(58) Field of Classification Search
CPC ......... A47J 31/542; C02F 1/482; C02F 1/484
USPC ................. 99/286, 300, 302 R, 307; 210/222
See application file for complete search history.

(56) References Cited

U.S. PATENT DOCUMENTS

| | | | |
|---|---|---|---|
| 50,773 A | 10/1865 | Parry | |
| 2,652,925 A | 9/1953 | Vermeiren | |
| 4,216,092 A | 8/1980 | Shalhoob et al. | |
| 4,808,306 A * | 2/1989 | Mitchell et al. | 210/222 |
| 5,113,751 A * | 5/1992 | Holcomb et al. | 99/286 |
| 5,134,924 A * | 8/1992 | Vicker | 99/280 |

(Continued)

FOREIGN PATENT DOCUMENTS

| | | |
|---|---|---|
| DE | 3932565 A1 | 4/1991 |
| DE | 9102938 U1 | 8/1991 |

(Continued)

*Primary Examiner* — Reginald L Alexander (57) ABSTRACT

A machine for preparing beverages with a hydraulic circuit includes a tank for the water: a boiler to heat the water; a pump to feed the water; a brewing unit that receives water from the boiler and into which a product for preparing the coffee or other food is inserted. The machine also has a magnetic field generator for treatment of the water to reduce the formation of calcareous deposits in said hydraulic circuit.

12 Claims, 4 Drawing Sheets

(56) References Cited

U.S. PATENT DOCUMENTS

| | | | | |
|---|---|---|---|---|
| 5,556,654 | A * | 9/1996 | Fregeau | 426/234 |
| 5,944,973 | A * | 8/1999 | Hall | 204/664 |
| 6,145,542 | A * | 11/2000 | Walker | 137/827 |
| 7,219,597 | B2 * | 5/2007 | Eicher | 99/293 |
| 7,229,561 | B1 | 6/2007 | Hamanaka et al. | |
| 7,299,742 | B2 * | 11/2007 | Meineke et al. | 99/281 |
| 7,322,274 | B2 * | 1/2008 | Wang | 99/280 |

FOREIGN PATENT DOCUMENTS

| | | |
|---|---|---|
| DE | 4314969 A1 | 12/1993 |
| EP | 0325185 A2 | 7/1989 |
| EP | 1006083 A1 | 6/2000 |
| JP | 55141592 A | 4/1980 |
| JP | 2069188 A | 3/1990 |
| JP | 2122888 A | 5/1990 |
| JP | 4028835 U | 3/1992 |
| JP | 6007251 A | 1/1994 |
| JP | 7177973 A | 7/1995 |
| JP | 9062929 A | 3/1997 |
| JP | 10180260 A | 7/1998 |
| JP | 11037383 A | 2/1999 |
| JP | 2005168926 A | 6/2005 |
| JP | 2006297346 A | 11/2006 |
| WO | 03000596 A1 | 1/2003 |
| WO | 2006029203 A1 | 3/2006 |

* cited by examiner

MACHINE FOR PREPARING BEVERAGES, IN PARTICULAR COFFEE, WITH LIMESCALE-PREVENTION SYSTEMS AND RELATIVE METHOD

TECHNICAL FIELD

The present invention relates to a machine for preparing a food product, in particular a beverage, and even more in particular coffee, using hot water.

STATE OF THE ART

Among the small domestic appliances used increasingly frequently are machines for preparing beverages by brewing with hot water. Typically, among these machines those intended to prepare coffee, of automatic, semi-automatic or manual type, are particularly prominent.

Electric machines for preparing beverages of this type normally present a container for the water and a hydraulic circuit, in general comprising a feed pump, a boiler and a brewing unit. In the brewing unit there is defined a brewing chamber, into which a food product is loaded (such as loose ground coffee, single-serving cartridges of ground coffee, cartridges of products to be diluted or dissolved in water and the like). Pressurized hot water is fed through the brewing chamber to extract the components of the beverage from the food products loaded into the brewing chamber.

One of the greatest drawbacks encountered in the use of these machines is the formation of calcareous deposits, in particular calcium carbonate, and to a lesser extend magnesium carbonate. These deposits usually form in the boiler, but also in the pipes through which the hot water passes, and gradually obstruct the flow of water. The incrustations that form in the boiler reduce the heat exchange efficiency, as in substance they form a thermally insulating layer.

The deposits that form are compact and adhere to the walls of the boiler and of the water pipes and must be periodically removed using chemical substances. Descaling operations are lengthy and troublesome for the user, requiring costly chemical products and subsequent wash cycles (reconditioning) of the machine are necessary, to remove residues of the chemical products used for descaling. In fact, the presence of these products in the beverage produced by the machine causes health hazards and organoleptic changes of the beverage.

However, in some cases the use of descaling cycles is not satisfactory and is not able to effectively remove carbonate incrustations from the hydraulic circuits of machines of this type.

OBJECT AND SUMMARY OF THE INVENTION

An object of the present invention is to provide a machine for preparing beverages using hot water, in particular a coffee machine, which overcomes entirely or in part the aforesaid drawbacks.

The object of a particular embodiment of the invention is to provide a machine in which the formation of calcium and magnesium carbonate deposits and other deposits that are difficult to remove from the hydraulic circuits is delayed, inhibited or in any case reduced.

According to a different aspect, an object of the invention is to provide a method for preparing a hot beverage, in particular coffee, that allows a reduction in the formation of limescale deposits without changing the organoleptic characteristics of the beverage and eliminating the need to use chemical descaling products or in any case reducing the frequency with which these are used.

In substance, according to an embodiment of the invention, there is provided a machine for preparing beverages and other foods, in particular coffee, using hot water, with a hydraulic circuit including: a water tank; a boiler to heat the water; a pump to feed the water; a brewing unit that receives water from said boiler and into which a product for preparing the beverage or other food product is inserted. The machine characteristically also comprises a magnetic field generator arranged to perform treatment of the water with the object of reducing the formation of limescale deposits in the hydraulic circuit.

The use of magnetic fields to influence the precipitation conditions of calcium and magnesium carbonates has been the subject matter of numerous studies with contradictory results as regards efficacy and attainable results. In general, attempts have been made to employ magnetic fields in the industrial treatment of waters and removal of calcium carbonate and magnesium carbonate by precipitation.

Already in 1865 U.S. Pat. No. 50,773 described the use of magnetic fields generated by permanent magnets to reduce the formation of calcareous deposits in boilers. U.S. Pat. No. 4,216,092 and U.S. Pat. No. 2,652,925 describe magnetic devices for water treatment. These devices comprise a pipe in which water containing calcium and magnesium ions flows and on the inside or outside of which a series of permanent magnets are arranged in a coaxial position with respect to the pipe, having the object of reducing adhesion of calcium and magnesium precipitates inside heat exchangers and boilers. EP-A-1006083 describes a similar system for treating industrial waters to reduce carbonate deposits. A further device for treating industrial waters using a magnetic field is described in EP-A-0325185.

Further magnetic systems for treating water flows for industrial purposes are described in WO-A-2006/029203 and in WO-A-03/000596.

However, although the possibility of influencing the precipitation conditions of calcium and magnesium carbonates using magnetic fields has been known for more than a century, to date it seems that this phenomenon has not been used as a system for preventing or reducing the formation of carbonate deposits inside machines for preparing foods and in particular in machines for preparing coffee.

This circumstance is particularly relevant considering the substantial drawbacks that derive from the precipitation and adhesion of carbonates in the hydraulic circuits of machines for preparing coffee, as highlighted above.

Using a magnetic field to reduce the formation of incrustations in coffee machines, substantial advantages are attained, including:
- increase in the life of the boiler and consequent reduction in technical assistance costs;
- improvement of the organoleptic properties of the food prepared;
- elimination of the use of chemical agents to clean the areas subject to formation of incrustations, or at least a substantial reduction in the use of these chemical agents;
- elimination (or at least reduction) of the wash cycles for reconditioning of the equipment after use of chemical descaling agents;
- energy saving due to less decrease of the heat exchange efficacy in the boiler, due to the reduction in the thickness of the incrustations that form therein, compared to the same operating times without the limescale-preventing magnetic device.

The magnetic field generator device can comprise one or more permanent magnets or one or more electromagnets or combinations of electromagnets and permanent magnets.

In one embodiment, the magnetic field generator can be arranged inside the water tank, from which the pump sucks water to feed it to the boiler of the machine.

In a preferred embodiment of the invention, the magnetic field generator device is positioned along one of the pipes of the hydraulic circuit of the machine. In one embodiment, the magnetic field generator is arranged along a pipe between the pump and the boiler, upstream of the boiler, to act on the water that flows from the pump to the boiler and to ensure that the effect of the magnetic field applied to the water reduces the formation of deposits inside the boiler that are difficult to remove. In one embodiment, one or more permanent magnets are arranged along the water flow pipe and on the outside thereof.

In some embodiments, the boiler can be of the type including a coil for the passage of water, arranged approximately coaxially on the outside or on the inside of an electrical resistance element which is also wound in a coil. In other embodiments the boiler can be of the type comprising a water container or tank with an inlet and an outlet, inside which a resistance element is arranged.

In one embodiment, the magnets are arranged with opposite polarities. For example, if a single pair of magnets is provided, these are positioned on the outside of the pipe, one facing the pipe with the north pole (N) and the other with the south pole (S). It would also be possible to arrange more than two magnets around the pipe, for example two pairs of magnets. In one embodiment, the magnets are arranged so as to align the poles N-S along the direction of flow of the water. It is possible to use a single magnet, or a single pair of magnets, or several pairs of magnets arranged in the same position, i.e. adjacent to one another, or aligned along the length of the pipe in which the water flows.

The pipe is preferably made of plastic material, such as Teflon, silicone, or other materials, which are suitable for contact with foods and such that they do not obstruct the passage of the field lines of the magnets arranged on the outside of the pipe. It would also be possible to arrange the magnets on the inside of the pipe.

It has been detected that greater efficacy is obtained if the magnetic field acts on water at a temperature higher than the ambient temperature. In particular, favorable results have been found when the magnetic field is applied to water with a temperature of around 60° C. or even 80° C. According to one embodiment of the invention therefore, the water is preheated upstream of the boiler and made to flow through the magnetic field or magnetic fields generated by the magnetic field generator already at a temperature above the ambient temperature, for example greater than 40° C. and preferably greater than 60° C. and above this value, for example equal to or greater than 70° C. To avoid moving the problem of precipitation of carbonates from the boiler of the machine to a section of the hydraulic circuit upstream of the boiler, preheating of the water preferably takes place in flow conditions, i.e. heating the water when it is moving through the pipe, for example by positioning an electrical resistance element in close proximity to the magnetic field generator so that it is not possible for calcareous incrustations to form upstream of the area in which the magnetic field acts.

In a possible embodiment the magnetic field used has a magnetic induction ranging from 0.1 to 5 Tesla (T), preferably from 0.2 to 1.5 T and even more preferably from 0.4 to 1.2 T. In one embodiment, the flow rate of water through the pipe on which the magnetic field or fields act is in the order of 90 g/min and in general between 50 and 200 g/min, preferably between 70 and 150 g/min.

One of the most important effects of the magnetic fields, the subject matter and debate of numerous studies, is that on the structure of calcium carbonate. This polymorphic crystalline compound crystallizes in three different ways:
 1. calcite: this is a hexagonal crystal and is the most thermodynamically stable form of $CaCO_3$, besides being one of the most common minerals in nature
 2. vaterite: this is a hexagonal crystal and is also stable, and is the smallest stable crystalline form
 3. aragonite: this is an orthorhombic crystal that is metastable at low temperatures and at atmospheric pressure; it precipitates in solution in a narrow range of physical-chemical conditions, and starts to precipitate at approximately 60-70° C.

It can be hypothesized that calcite crystals cause resistant incrustations, while the presence of aragonite, which is often present in the form of needle-shaped crystals, is the main cause of the formation of deposits that are softer, porous, soluble and more easily removed. This should be the mechanism through which magnetic fields influence the deposits of incrustations, although the nature of the phenomenon still remains devoid of a precise scientific explanation.

According to a different aspect, the invention relates to a method for preparing a beverage or other food product, and in particular for preparing coffee by brewing ground coffee with hot water, wherein to reduce or eliminate the formation of calcareous deposits the water is subjected to the effect of at least one magnetic field.

According to a particular embodiment, the method provides for treatment of the water before it enters the boiler. According to an improved embodiment of the invention, the method provides for a step in which the flow of water is preheated, passes through at least one magnetic field and subsequently enters the boiler to raise the temperature to the temperature useful for brewing.

Further advantageous features of the method and of the machine according to the invention are set forth in the appended claims.

BRIEF DESCRIPTION OF THE DRAWINGS

The invention will be better understood by following the description and the accompanying drawing, which shows practical non-limiting embodiments of the invention. More in particular, in the drawing.

DETAILED DESCRIPTION OF EMBODIMENTS OF THE INVENTION

The present invention will be described below applied to an automatic coffee machine, although it can also be used on semi-automatic or manual electric coffee machines or in general to machines for preparing beverages or other foods using hot water.

Figure 1:
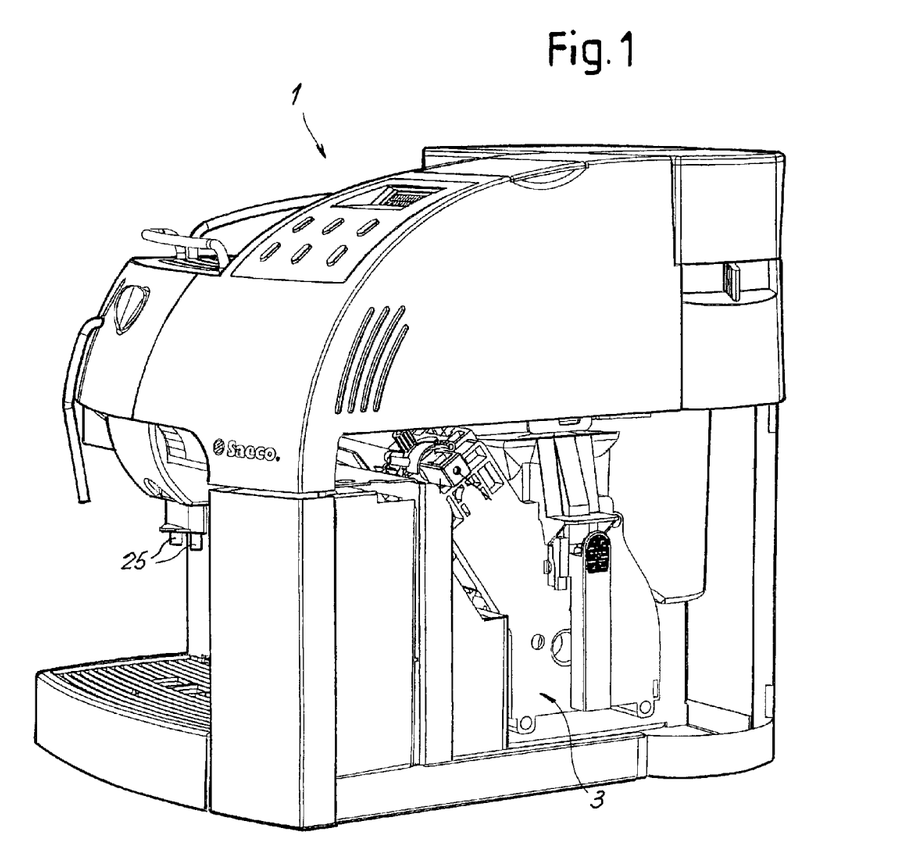
FIG. 1 shows an automatic coffee machine to which the present invention can be applied.

FIG. 1 schematically shows and indicates with 1 a coffee machine comprising a brewing unit 3 of automatic type known per se.

The diagram of FIG. 2 again shows the automatic brewing unit 3 which is supplied in the manner described below with water coming from a tank 5 usually located in the rear area of the machine 1. Through a flow meter 7 (e.g. a turbine flow meter) to measure the flow rate, the water is sucked from the tank 5 by means of a pump 9 that feeds a boiler 11. The number 13 indicates a pipe that connects the pump 9 and the boiler 11 and the number 15 indicates the pipe that connects the boiler 11 to the brewing unit 3. The pump 9 can be equipped with a recirculation pipe 17 that allows recirculation of the water delivered from the pump 9 toward the inlet thereof. The recirculation pipe 17 is connected to the pump 9 through three way valves 19 and 21.

Figure 2:
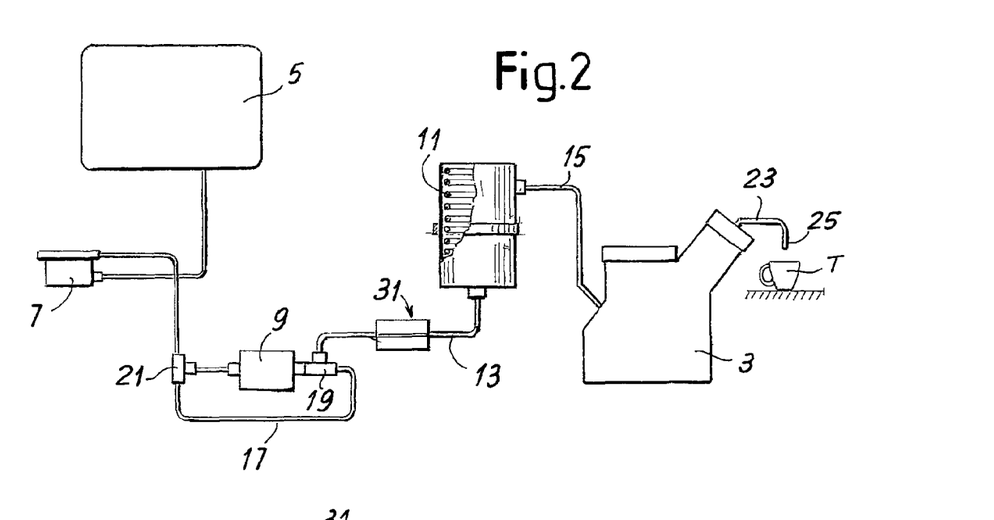
FIG. 2 shows a diagram of the parts of the machine of FIG. 1 relevant for the understanding of the present invention.

The number 23 indicates a delivery pipe of the coffee that terminates with a dispensing spout 25 or with a pair of dispensing spouts 25, under which one or two cups T can be placed to collect the coffee obtained from brewing inside the brewing chamber formed in the unit 3.

Figure 3:
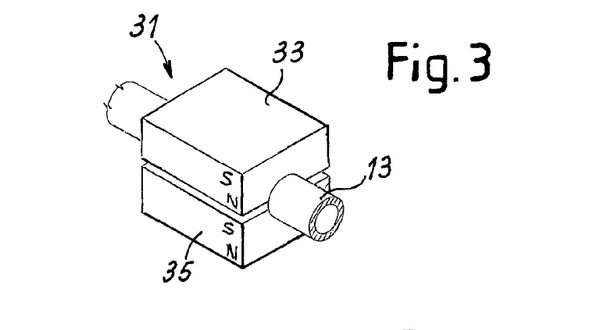
FIG. 3 shows a detail of the arrangement of the magnets.

According to one embodiment of the invention, a magnetic field generator 31 is arranged along the duct 13. In one embodiment the generator 31 includes a first permanent magnet 33 and a second permanent magnet 35, positioned opposite each other around the pipe 13. This pipe is advantageously made of plastic material, for example Teflon, silicone or in another material suitable for food contact, i.e. compatible for contact with the water intended for preparing the beverage. The material of which the pipe 13 is composed is also such as not to obstruct passage of the force lines of the magnetic field generated by the two permanent magnets 33 and 35.

In one embodiment the magnets 33 and 35 are arranged with opposite polarities: the magnet 33 is positioned with the north pole (N) facing the pipe 13, while the magnet 35 is positioned with the south pole (S) facing said duct.

To verify the efficacy of the magnetic system in reducing the formation of permanent calcium carbonate incrustations an experiment was conducted on two coffee machines, identical except for the presence of the magnetic field generator 31 in one but not in the other. The machines remained switched on for the same number of hours and the same quantity of water was made to circulate therein to generate the same number of coffees and produce the same quantity of steam in identical operating conditions. Accumulation of limescale was evaluated by disassembling the boilers of the two machines several times and weighing them, after elimination of residual water by blowing with compressed air and drying at ambient temperature. The increase in weight in time is ascribable to the formation of calcium carbonate incrustations on the walls of the boilers. The machines were equipped with coil-type boilers, with a helical pipe for passage of the water, with a resistance element also helically wound, arranged inside the volume enclosed by the turns of the water pipe.

The machines were subjected for the period of the experiment to intensive use by making a large number of coffees and drawing off large amounts of hot water and smaller amounts of steam to accelerate deposit times and thus obtain relevant quantities of limescale in the boiler. All the volumes of water employed were monitored and recorded.

Figure 4:
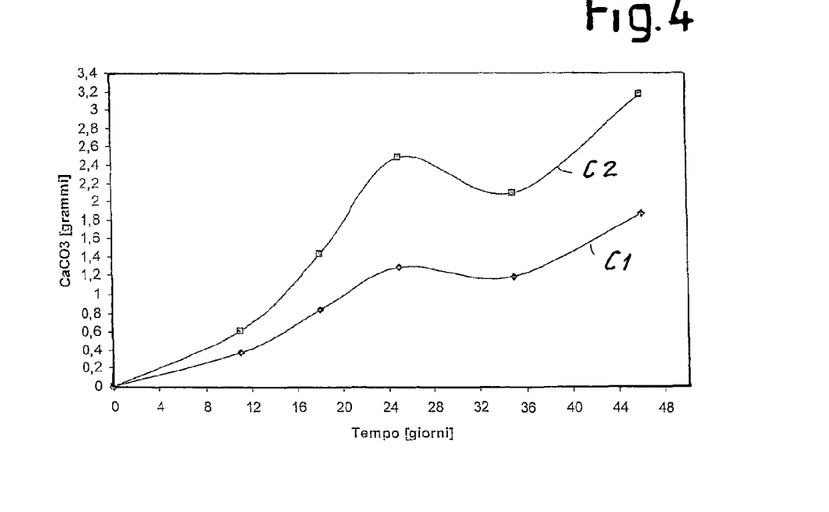
FIG. 4 shows a diagram showing the experiment results obtained in a cycle of tests.

FIG. 4 shows the results obtained in these experiments. The abscissa shows the number of days of the experiment and the ordinate shows the quantity in grams of calcium carbonate ($CaCO_3$), given by the difference in weight of the boiler at each weighing with respect to the weight of the new boiler. The curve C1 forms the interpolation between the measurement points performed on the machine equipped with the magnetic field generator, while the curve C2 is the interpolation curve of the results obtained on the machine for comparison. The following table summarizes the experiment data obtained after 11, 18 and 46 days of the experiment respectively.

| Days of operation | Weight of limescale in the machine with magnets (g) | Weight of limescale in the machine without magnets (g) | Reduction % |
|---|---|---|---|
| 11 | 0.37 | 0.62 | 40.3 |
| 18 | 0.85 | 1.44 | 41.0 |
| 46 | 1.88 | 3.17 | 40.7 |

In the graph of FIG. 4 and in the preceding table a reduction in the order of 40% in the formation of limescale can be seen due to the use of the magnetic field generator 31.

Examination of the boilers after the tests showed that the limescale incrustation in the control boiler, without magnets, is very consistent and compact, and present in large quantities. Images taken with a scanning electron microscope showed a heterogeneous distribution of crystals with elongated prismatic habitus. Crystallographic examination showed a mixed calcic component and a noteworthy aragonite component. These observations were confirmed also by analysis performed with X rays.

The boiler with magnets showed the presence of a deposit with a formation easily removable without the need to use any particular force to cause detachment thereof from the walls. The quantity of deposit was clearly lower with respect to the case of the control boiler. Microscopic examination revealed a homogeneous dimensional distribution of the crystals, with elongated prismatic habitus having, however, smaller dimensions with respect to the case of the control boiler. Also in this case analysis performed with X rays showed a prevalent presence of aragonite phase. Moreover, it was observed that the deposit obtained in the boiler with magnets had a higher degree of void with respect to that formed in the boiler without magnets.

Figure 5:
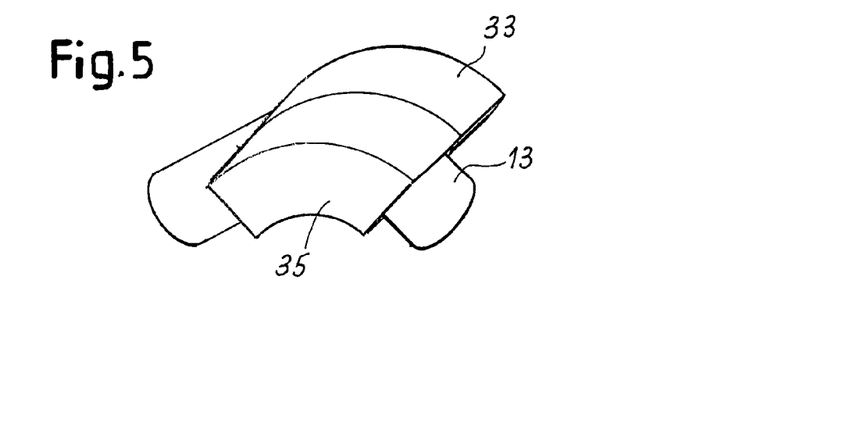
FIG. 5 shows a diagram of application of a pair of permanent magnets to a U-shaped pipe.
Figure 6:
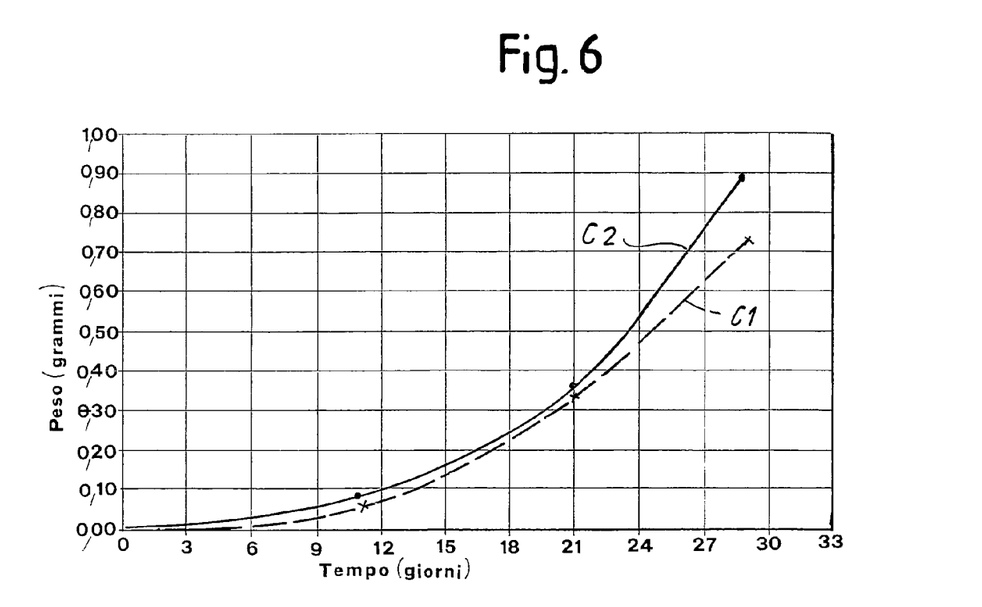
FIGS. 6, 7A and 7B are diagrams showing the results of further experiments with an arrangement of magnets as shown in FIG. 5.

FIG. 5 schematically shows a different arrangement of the magnets, again indicated with 33, 35, which in this case are C or U shaped and are applied to a curve or elbow of a pipe 13. A configuration of this type was employed for a second cycle of experiments, employing magnets with an intensity of 0.1 T of semi-circumferential shape, applied around a steel tubing elbow with an internal diameter of 4 mm and an external diameter of 7 mm and a length of 30 mm. FIG. 6 shows curves similar to those of FIG. 4. The curves C1 and C2 indicate the trend of the weight in grams (ordinates) as a function of the operating time (in days on the abscissas). The curve C1 is relative to the boiler with magnets, the curve C2 to the boiler without magnets (control boiler).

Figure 7A:
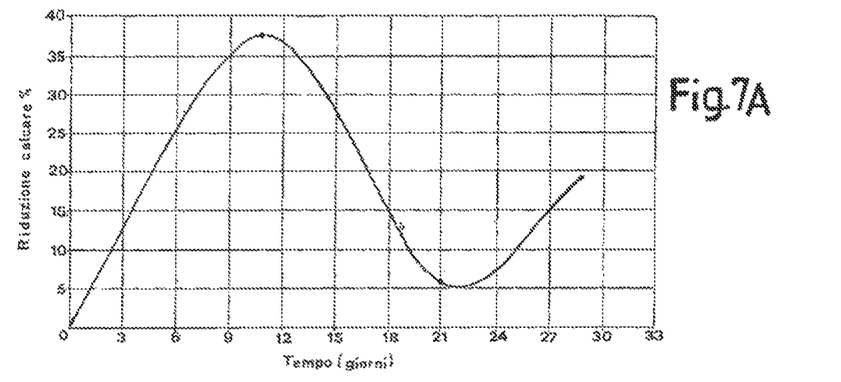
Figure 7B:
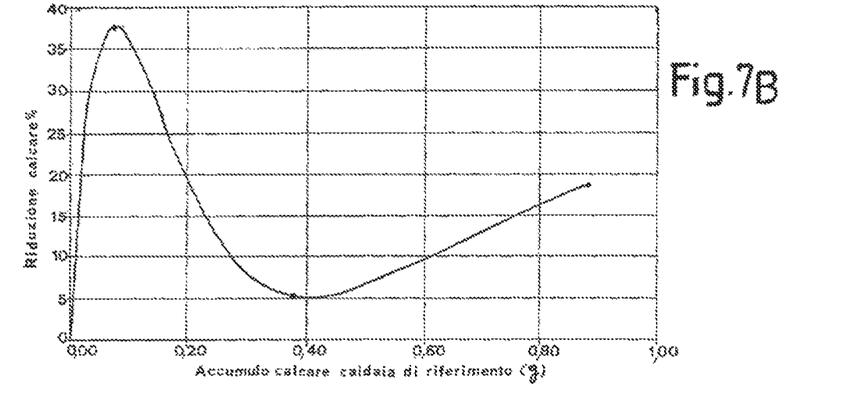

FIG. 7A shows the curve representing the reduction in percentage of limescale as a function of time, while FIG. 7B shows the curve representing the reduction in percentage of limescale in the boiler with magnets (ordinates) as a function of the accumulation of limescale in the control boiler (on the abscissas, in grams).

Without being limited to any type of chemical-physical explanation of the complex phenomena that may lead to the significant experiment results obtained, it can be observed that the relevant effect of the magnetic field is not that of modifying the chemical balance of the water, but of interfering with the nucleation processes of the crystals acting on the levels of hypersaturation around the germ and of causing a modification of the crystallochemical phase. As indicated previously, the calcium carbonate in its crystalline form can be present in three different phases:
1. calcite, with crystallization in the rhombohedric system with three axes
2. aragonite, with crystallization in the rhombic system with one axis
3. vaterite, with spherical type crystallization.

Of the three forms, the one most thermodynamically probable at ambient temperature and pressure is the stable form of calcite.

In normal processes to heat water in thermal circuits, calcium bicarbonate in its subsequent decomposition with formation of the carbonatic species, forms a compact incrustation that adheres strongly to the metal walls. An interpretation of the evolution and formation of calcite lies in a deficiency of a pair of electrons on the carbon atom, deficiency that the carbon atom tends to eliminate by capturing a pair of electrons from an atom having donor capacity. This attitude is typical of metals that generally possess free pairs of electrons that can be shared.

In the majority of cases, this action is exerted by the surfaces in contact with the water, which, with its microscopic roughness, promotes the formation of crystalline germs by sharing a pair of electrons with the carbon, forming a metal-carbon bond that fixes the crystalline germ stably to the walls, said germ which will grow constantly. This growth is to be found on the atoms that acted to form the bond, on which charge residues remain, which trigger dipoles that act as points of attraction and orientation for other molecules which subsequently aggregate. The bond between the molecules in the crystallization process will not take place chaotically, but will take place according to the orientation of the existing electric dipoles and of the magnetic fields generated by the electrons. Attachment of the molecules will be oriented in space according to the directions in which attractions are greater and magnetic interferences are lower.

On the basis of these electrochemical aspects any influence exerted by a magnetic field applied from outside causes a physical but not chemical structural modification, as it would not influence the solubility of the compounds, and therefore vary the value of the solubility product.

This influence, which increases in relevance in proportion to the increase in the intensity of the magnetic field, is determining in the evolution and development of crystalline germination. In the phenomenon of solvation, each metal ion is surrounded by a certain number of water molecules as a result of the presence of electric dipoles, the charged ends of which are oriented in space following electrostatic attraction of the ions. In this water-ion complex, the ion occupies the central cavity and the effective radius of the ion depends on the orientation of this dipole. The effective radius is greater than the crystallographic radius and for the cations, when no external force is applied, this difference is 0.1 A.

The influence of a high intensity magnetic field capable of canceling the magnetic field created by the electrons, prevents free and harmonic orientation. The dipoles must therefore be oriented according to the force lines of the magnetic field applied and this forced orientation will influence the effective radius of the ion.

In the case of the calcium ion, this forced orientation of the dipoles causes a noteworthy increase in the effective radius with respect to the crystallographic radius, in this way it behaves like an ion with ion radius greater than 0.1 A giving rise to crystals of the rhombic and not of the rhombohedric system. This deformation of the ion corresponds to an absorption of energy by the system, which is transferred to the precipitate, composed of the aragonite phase, metastable with an energy content higher than that of calcite. However, the antiscaling effect is probably not to be found only in the different crystallochemical form of formation by calcite and aragonite, as, both, in particular calcite, give rise to compact aggregates and deposits. In fact, in the formation of aragonite, the molecules are oriented according to the force lines of the magnetic field as a result of the present of an electric dipole and this modification would cause a steric impediment to the construction of the crystalline network, as it cannot be oriented freely in space and join according to the lines of attraction of the electric dipoles present thereon. Said attractions form the intramolecular forces that cause crystalline cohesion. The absence of these leads to the formation of amorphous deposits, which have the form of a light and inconsistent powdery talc, composed of a plurality of tiny crystals having a very light acicular habitus easily removable by the fluid dynamic action of water.

Figure 8:
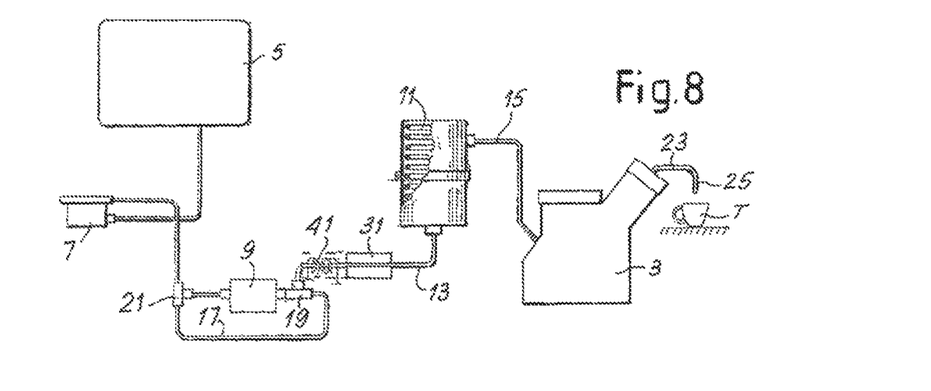
FIG. 8 shows a diagram similar to that of FIG. 2 in an improved embodiment of the invention.

Results even more relevant to those indicated above can be obtained with an improved embodiment of the invention, shown schematically in FIG. 8. The same numbers indicate the same or equivalent parts to those of the diagram of FIG. 2.

In the embodiment of FIG. 8, in addition to the components already described with reference to FIG. 2, there is provided, in association with the magnetic field generator 31, a system 41 to preheat the water that flows through the pipe 13 toward the boiler 11. The preheating system 41 is schematically represented as an electrical resistance element wound around the pipe 13. In actual fact, the preheating system can be composed, for example, of a portion of pipe 13 made of metal material or another thermally conductive material to allow flow-preheating of the water directly upstream of the magnetic field generator 31 or even inside the area in which said generator is positioned. It is thus possible to heat the water during flow thereof toward the boiler an area immediately adjacent to or coincident with that of action of the magnetic field generated by the magnet(s) of the generator 31.

In this way the problem of simply transferring the problem and formation of calcareous deposits from the boiler 11 to the preheating system is avoided. At the same time it is possible to magnetically treat the partially heated water obtaining a more incisive effect of the magnetic field in preventing the formation of calcareous deposits. Suitable preheating temperature values can range from 40 to 80° C. and preferably from 50 to 70° C. or greater.

It is understood that the drawing shows just one example, provided merely as a practical demonstration of the invention, which can vary in its forms and arrangements, without however departing from the scope of the concept underlying the invention. Any reference numbers in the appended claims are provided to facilitate reading of the claims with reference to the description and to the drawing, and do not limit the scope of protection represented by the claims.

The invention claimed is:
1. A machine for preparing beverages and other foods using hot water, with a hydraulic circuit including:
    a water tank for storing water;
    a boiler to heat the water;
    a pump to feed the water to the boiler;
    a brewing unit that receives water from said boiler and into which a product for preparing the beverage or other food product is inserted;

a magnetic field generator for treating the water to reduce the formation of limescale deposits in said hydraulic circuit; and a preheating device for preheating the water upstream of said boiler, wherein said preheating device is associated with said magnetic field generator and is arranged so that the water that passes through said magnetic field is at a temperature above the ambient temperature heated by said preheating device for treatment by the magnetic field generator and further heating by the boiler, and wherein said preheating device is arranged and designed to heat the water while it flows through the magnetic field.

2. The machine of claim 1, wherein said magnetic field generator comprises at least one permanent magnet.

3. The machine of claim 1, wherein said magnetic field generator comprises at least one electromagnet.

4. The machine of claim 1, wherein said magnetic field generator is arranged along a water flow pipe.

5. The machine of claim 1, wherein said magnetic field generator includes a pair of magnets positioned opposite each other, between which a volume containing water is defined.

6. The machine of claim 5, wherein the magnets of said pair are arranged facing each other with opposite polarities.

7. The machine of claim 5, wherein said volume comprises a portion of a water flow pipe.

8. The machine of claim 1, wherein the machine is a coffee machine.

9. The machine of claim 8, further comprising a brewing chamber to contain the ground coffee, through which the flow of water fed from said boiler passes.

10. A machine for preparing beverages and other foods using hot water, with a hydraulic circuit including:
a water tank;
a boiler to heat the water;
a pump to feed the water;
a brewing unit that receives water from said boiler and into which a product for preparing the beverage or other food product is inserted;
a magnetic field generator for treating the water to reduce the formation of limescale deposits in said hydraulic circuit; and
a preheating device for preheating the water upstream of said boiler,
wherein said magnetic field generator is positioned along a flow pipe feeding the preheated water to said boiler upstream of said boiler, and
wherein said preheating device is arranged and designed to heat the water while it flows through the magnetic field.

11. The machine of claim 10, wherein said magnetic field generator is arranged between said pump and said boiler.

12. A machine for preparing beverages and other foods using hot water, with a hydraulic circuit including:
a water tank;
a boiler to heat the water;
a pump to feed the water;
a brewing unit that receives water from said boiler and into which a product for preparing the beverage or other food product is inserted;
a magnetic field generator for treating the water to reduce the formation of limescale deposits in said hydraulic circuit; and
a preheating device for preheating the water upstream of said boiler,
wherein said preheating device is arranged at least partly in the magnetic field generated by said magnetic field generator.

* * * * *